Jan. 25, 1955  K. J. DE JUHASZ  2,700,540

MECHANICAL SPRING

Filed June 2, 1950

Inventor

Kalman J. DeJuhasz

By G. J. Kessenich & J. H. Church.

Attorneys

United States Patent Office 2,700,540
Patented Jan. 25, 1955

2,700,540

MECHANICAL SPRING

Kalman J. De Juhasz, State College, Pa., assignor to the United States of America as represented by the Secretary of the Army Application June 2, 1950, Serial No. 165,816

13 Claims. (Cl. 267—1)

My invention relates to improvements in helical springs and more particularly to mechanical springs with inherent damping for use in internal combustion engine valve gear, and in ordnance devices such as small arms and machine guns, which in operation are subjected to suddenly applied impact-like forces. It is well known that springs used in the strenuous service inherent in such applications are subject to fatigue failure which manifests itself either by fracture, or by an excessive permanent deformation which renders them incapable of exerting the required spring force. My invention mitigates the fatigue of the spring and thereby accomplishes a substantial increase in the useful life of the spring. Let it be assumed that a helical spring rests, at one end, on a stationary support while to its other end a displacement is imparted. If the spring is short and the displacement takes place slowly then it is approximately true that all coils will move simultaneously, that the strains and stresses at all points in the spring are equal at any given instant, and that after the motion of the displaced end had ceased the spring will come to rest in its entirety. This view of the phenomenon is tantamount to the assumption of an infinite velocity of propagation of a disturbance.

Actually, however, the disturbance imparted to one end of the spring is propagated along the spring wire with a finite velocity, and only after the elapse of a certain time does it arrive at the other, stationary end. There the motion is stopped and the stoppage is propagated toward the moving end where the spring is set into motion again. As a consequence the change of velocity in the intermediate coils, and also the change of stress which is interdependent with the change of velocity, are not gradual but take place abruptly at each reversal of the wave. The changes of velocity and of stress traveling back and forth along the spring with the velocity of propagation are termed surges. A consequence of this spring behavior is that the spring coils located between the two ends may, and in general do, execute to and fro motions even after the movable end of the spring had come to rest and therefore both spring ends are stationary. This motion persists until the frictional and damping forces dissipate the energy of vibration, and only after that does the spring come to rest throughout its entire length. It will be realized that if the movable end of the spring is subjected to one to and fro motion the coils of the spring will execute several to and fro motions producing in the spring several stress cycles. Thus, if a repeated motion is imposed on the movable end of the spring, for example in valve springs and machine gun springs, the stress cycles undergone by the spring may exceed several times the number of to and fro motions imposed on the movable end.

A further consequence of the finite velocity of propagation is that if the force is applied suddenly then only a portion of the spring is displaced, i. e., not the entire length, and in that portion a greater stress is produced than would be the case if the displacement would be evenly distributed over the entire length of the spring. Thus the surge stress is a function of the velocity of displacement, and in an extreme case it may result in the coils in a portion of the spring coming into contact with one another, even though the entire spring is not compressed to solid length. This explains that at impact-like spring load the stress is higher than at slowly applied load.

The detrimental effect of spring surges on the fatigue life of the spring has been long recognized and various means have been employed for their mitigation, by introducing intentional frictional and damping forces in order to dissipate the vibration energy of the spring and thereby to reduce the number of surges between the periods of imposed reciprocating motions. Among these means are to be mentioned: friction sleeves surrounding and pressing against the outer surface of the spring, and springs made of a severality of wires stranded together. These means have however the disadvantage that the frictional or damping effect is present throughout the travel of the spring, whereby not only the harmful surge but also the useful spring force is reduced.

My invention consists in the introduction of an energy dissipating effect in a particularly simple and effective manner, and in such a way that the energy dissipation comes into play only when the coils come into contact with one another, i. e., whenever excessive surge stresses occur.

The principle, construction and advantages of my invention will be explained with the aid of the accompanying drawings.

Figure 1:
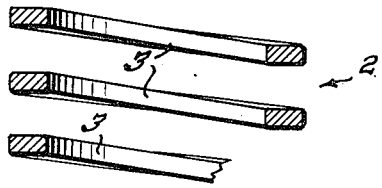
Figure 1 shows a fragmentary view of a conventional helical spring of rectangular cross section wire, subjected to less than its maximum force.
Figure 2:
Figure 2 shows the spring according to Figure 1, subjected to a force sufficient to bring the coils into contact with one another.
Figure 3:
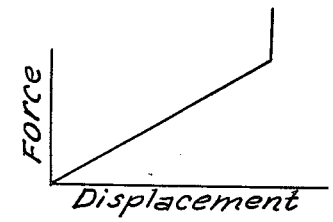
Figure 3 is the force displacement diagram of the spring according to Figures 1 and 2.

Referring to Figures 1 and 2 there is shown a helical spring 2 of conventional design, constructed of a rectangular cross section wire, having under compression a force displacement characteristic shown in Figure 3. As the force is increased the displacement is increased proportionally until the coils 3 come into contact with each other; any increase of force beyond this produces no further displacement. There is no frictional or damping force inherent in the spring. The diagram of Figure 3 shows that the increasing force substantially coincides with the decreasing force.

Figure 4:
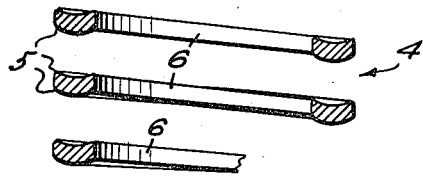
Figure 4 shows a fragmentary view of a helical spring embodying my invention made of "kidney" profile cross section wire, subjected to less than its maximum force.
Figure 5:
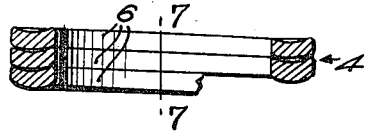
Figure 5 shows the spring according to Figure 4 subjected to a force sufficient to bring the coils into contact with one another.
Figure 6:
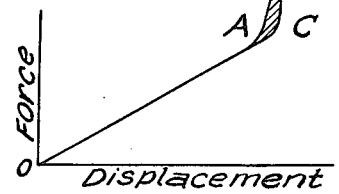
Figure 6 is the force displacement diagram of the spring according to Figures 4 and 5.

The helical spring 4, Figures 4 and 5, embodying my invention is constructed of a wire having a cross section of curved rectangular shape with rounded edges 5, resembling a kidney shape, and in the following is termed the "kidney" profile wire. Figure 4 shows spring 4 in the condition in which the coils 6 are not in contact and Figure 5 in the condition in which the coils 6 are in contact with each other. The latter condition corresponds in the force displacement diagram, Figure 6, to point A. If the force is increased still further, a further, though slight, displacement will take place at a much steeper angle, in accordance with the ascending line A—B, because the curved wire cross section itself will tend to straighten out. Decreasing the force, below B, will produce the descending force displacement line B—C—A, which is situated below the ascending line, on account of the frictional forces engendered at the contact of the adjacent coils. A further decrease of the force will produce a force displacement line substantially coincident with the proportional portion of the ascending line O—A. The area enclosed by the ascending and descending lines, A—B—C—A, represents the work expended on friction by which the energy of vibration is reduced at every vibration period of the spring. This energy dissipating effect comes into play only at and beyond forces which are sufficient to close the coils of the spring; at forces below this value the spring characteristics are of similar nature to that of a conventional spring.

Figure 7:
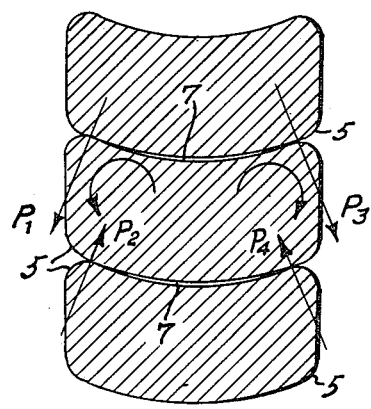
Figure 7 is an enlarged view of the section taken along line 7—7 of Figure 5 illustrating the "kidney" profile.

The behavior of the spring wire under conditions at which the coils 6 are in contact is clarified further by Figure 7 which shows three adjacent wire cross sections in contact with one another. It is seen that at the points of contact, forces $P_1$, $P_2$, $P_3$, and $P_4$ come into play in locations and directions normal to the profile of the cross section at the points of contact. The forces $P_1$ and $P_2$ form one couple and the forces $P_3$ and $P_4$ form another couple equal and opposite to the former. The two couples will tend to deform and bend the profile in the sense of reducing its curvature. When such deformation takes place, even if a minute one, a slippage will occur at the contact points, which, in conjunction with the frictional force will result in an amount of energy cancelled by friction.

By reference to the drawings, particularly Figure 7, it will be seen that there is a slight crescent-shaped gap between two adjacent cross sections when these contact at two points; the height of this gap is progressively reduced as the force acting on the spring is increased. The limit of deformation is attained when the height of the gap is reduced to zero, after which the spring acts as a solid column.

Figure 8:
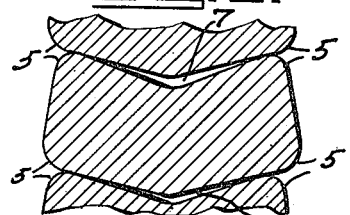
Figure 8 is a view similar to that of Figure 7, illustrating the "chevron" cross section profile.
Figure 9:
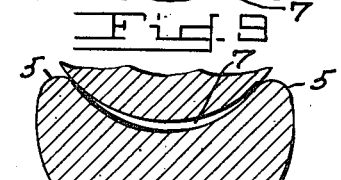
Figure 9 is a view similar to that of Figure 7, illustrating the "crescent" profile.

Figure 8 shows a modification of the wire profile in accordance with my invention. This modification is essentially of V-shape and is termed a "chevron" profile and Figure 9 shows another modification of the wire profile in accordance with my invention. This modification is formed essentially of two intersecting arcs of circles, with well rounded ends and is termed a "crescent" profile. The functioning of the modifications shown in Figures 8 and 9 is similar to that described in detail for the "kidney" profile.

I claim:

1. A helical compression spring for energy dissipation under excessive vibration stresses, constructed of wire having a shape in radial cross section providing upper and lower surfaces, said upper surface being generally concave and said lower surface having a general convexity less than said concavity, each said convexity and said concavity having a gradual convergence toward the lowermost point thereof, said spring having contiguous convolutions with adjacent surfaces engaging each other at radially spaced points only to form therebetween a cavity generally crescent-shaped in radial cross section when sufficient compression load is applied to fully compress said spring, whereby sliding friction between said points of engagement reduces the energy of vibration.

2. A helical compression spring according to claim 1, the wire cross section being kidney shape having at its convex side a radius of curvature larger than at its concave side, and having its four corners rounded whereby a bending moment is produced tending to reduce the curvature of the cross section whenever a compressive force is applied which is in excess of the force necessary to close said convolutions.

3. A helical compression spring according to claim 1, the wire cross section being of chevron shape, having at its convex side a wider angle than on its concave side, and having its four corners rounded, whereby a bending moment is produced tending to straighten out the cross section whenever a compressive force is applied in excess of the force necessary to close said convolutions.

4. A helical compression spring according to claim 1, the wire cross section being of crescent shape having at its convex side a larger radius of curvature than on its concave side, and having its two corners rounded, there being formed a crescent shaped gap between two adjacent cross sections when said convolutions are in contact, said crescent shaped gap being reduced whenever a compressive force is applied in excess of the force necessary to close said convolutions.

5. A helical compression spring for energy dissipation under excessive vibration stresses, constructed of wire having a shape in radial cross-section providing upper and lower surfaces, said upper surface being generally concave and said lower surface having a general convexity less than said concavity, said spring having contiguous convolutions contacting along inner and outer peripheral helical lines only to form a space therebetween generally crescent-shaped in radial cross-section when said spring is fully compressed, whereby sliding friction between said lines of contact reduces the energy of vibration.

6. A helical compression spring according to claim 5, the wire cross section being kidney shape having at its convex side a radius of curvature larger than at its concave side, and having its four corners rounded, whereby a bending moment is produced tending to reduce the curvature of the cross section whenever a compressive force is applied which is in excess of the force necessary to close said convolutions.

7. A helical compression spring acording to claim 5, the wire cross section being of chevron shape, having at its convex side a wider angle than on its concave side, and having its four corners rounded, whereby a bending moment is produced tending to straighten out the cross section whenever a compressive force is applied in excess of the force necessary to close said convolutions.

8. A helical compression spring according to claim 5, the wire cross section being of crescent shape having at its convex side a larger radius of curvature than on its concave side, and having a crescent shaped gap formed between two adjacent cross sections when said convolutions are in contact, said crescent shaped gap being reduced whenever a compressive force is applied in excess of the force necessary to close said convolutions.

9. A helical spring for energy dissipation under excessive vibration stresses, constructed of wire having a plurality of convolutions each convolution having a shape in radial cross section providing upper and lower surfaces, said upper surface being generally concave and said lower surface having a general convexity less than said concavity, said concavity increasing gradually from zero at the ends of said cross section to a maximum at the center thereof, said spring having contiguous convolutions with adjacent surfaces of each radial cross section engaging each other at radially spaced points only to form a cavity therebetween when sufficient compression load is applied to fully compress said spring, whereby sliding friction between said points of engagement reduces the energy vibration.

10. A helical spring according to claim 9, each said cross section being kidney-shaped and having at said convex surface a larger radius of curvature than said concave surface, each corner of said cross section being rounded, whereby an applied force greater than a force necessary to close said coils produces opposed bending moments at said points of engagement to dissipate energy caused by vibration stresses.

11. A helical spring according to claim 9, each said cross section being crescent shaped and having at said convex surface a larger radius of curvature than on said concave surface, each corner of said cross section being rounded to provide a crescent shaped gap between adjacent surfaces of contiguous convolutions when in engagement, whereby a compressive force in excess of a force to place said convolution in engagement reduces said crescent shaped gap.

12. A helical spring according to claim 9, each said cross section being of chevron shape and having at said convex surface a wider angle than at said concave surface, each said cross section having rounded corners, whereby an applied compressive force in excess of a force required to close said convolutions produces opposed bending moments at said points of engagement tending to straighten out said cross section.

13. A helical spring for energy dissipation under vibration stresses, constructed of wire having a plurality of contiguous convolutions, each convolution having a shape in radial cross section providing upper and lower surfaces with the centers of the upper and lower surfaces lower than the corresponding ends of said surfaces, said upper center having a departure normal to a line through its corresponding ends greater than the corresponding departure of said lower center, the departure of said upper surface increasing gradually from zero at the ends of said upper surface to a maximum at the center thereof, said spring having contiguous convolutions with adjacent surfaces engaging each other at radially spaced points only to form a cavity therebetween when sufficient compression load is applied to fully compress said spring, whereby sliding friction between said points of engagement reduces the energy of vibration.

References Cited in the file of this patent

UNITED STATES PATENTS

| | | |
|---|---|---|
| 1,250,585 | Johnson | Dec. 18, 1917 |
| 1,933,460 | Templeman | Oct. 31, 1933 |
| 2,211,760 | Berg et al. | Aug. 20, 1940 |
| 2,441,166 | Raspet | May 11, 1948 |
| 2,534,248 | Danielsen et al. | Dec. 19, 1950 |

FOREIGN PATENTS

| 19,864 | Great Britain | 1910 |
|---|---|---|